FIG. 1A

INVENTOR.
STEPHEN R. FISCH
&
LYNN A. STAPLES
BY
William Grobman

INVENTORS
STEPHEN R. FISCH
&
LYNN A. STAPLES

BY William Grobman

May 19, 1970  S. R. FISCH ET AL  3,513,246
ANALOG COMPUTER

Filed April 24, 1967  7 Sheets-Sheet 5

FIG. 2C

INVENTORS
STEPHEN R. FISCH
&
LYNN A. STAPLES

BY William Grolman

United States Patent Office 3,513,246
Patented May 19, 1970

3,513,246
ANALOG COMPUTER
Stephen R. Fisch, Binghamton, and Lynn A. Staples, Greene, N.Y., assignors to Singer-General Precision, Inc., a corporation of Delaware
Filed Apr. 24, 1967, Ser. No. 633,054
Int. Cl. G06g 7/16, 7/14, 7/32
U.S. Cl. 35—10.2
6 Claims

ABSTRACT OF THE DISCLOSURE

The flight computer of this invention is a small, lightweight, inexpensive, special-purpose analog computer for fixed-base aviation trainers, and it utilizes solid-state electronic components rather than the servo motor systems used as analog computers in earlier systems. This computer is designed to generate electrical signals representative of various airplane responses to change the conditions produced by both a student trainee and an instructor while the trainee is performing control operations on a simulated aircraft. The composite signals generated by the computer are used to control both the motion of the trainer and the instruments within it.

Since the early Link Trainers, fixed-base simulators have been used to help in the training of aircraft pilots. The increasing sizes and complexities of modern aircraft have accelerated the development of special purpose trainers which serve to train pilots, navigators, and similar flight personnel in their respective duties for individual types of aircraft. In fact, emphasis in recent years has been on unique trainers for each new type of airplane developed. As a result, there has been less of an emphasis on the general-purpose aviation trainers which can be used as aids in the basic training of new pilots. The small aircraft and executive aircraft fields have been growing in recent years, and the number of new pilots for these types of aircraft has also been growing. The need for a small, inexpensive, reliable, general-purpose aviation trainer has become acute. One of the basic parts of such a trainer, and also one of the most expensive parts of that trainer, is the flight computer.

The flight computer is that device which has been constructed to incorporate the flying characteristics of either a particular aircraft or a composite of a group of aircraft of a similar type, to receive input signals from the controls as they are manipulated by a student pilot and, in many cases, to receive input signals from an instructor, to produce output signals which result in the proper movements of the simulated cockpit (if the trainer includes a motion system), and to control the instruments contained within the trainer so that the feedback loop is completed by giving to the student pilot the proper aircraft responses. In the past, the flight computers have been large, bulky and expensive. For many years flight computers used in simulators were analog type computers which utilized large numbers of servo systems to integrate the various equations from which the control signals are derived. The servo systems were expensive, were large and heavy, and required power supplies which were of a significant size and weight also. Because of this, the construction of a low-cost, general-purpose, fixed-base aviation trainer has not been particularly feasible. This invention constitutes a departure from past devices of a similar nature by eliminating the servo systems and providing in a simplified system, a flight computer which accomplishes the desired results in a small package with a lightweight and at a low cost.

It is an object of this invention to provide a new and improved computer.

It is another object of this invention to provide a new and improved computer for fixed-base aviation trainers.

It is a further object of this invention to provide a new and improved computer for fixed-base aviation trainers, which computer utilizes solid-state devices in simplified configuration.

It is still another object of this invention to provide a new and improved analog-type computer for fixed-base aviation trainers, which computer is small but reliable.

It is yet another object of this invention to provide a new and improved lightweight, small and reliable analog computer for fixed-base aviation trainers.

Other objects and advantages of this invention will become apparent as the following description proceeds, which description should be considered together with the accompanying drawings in which:

FIGS. 2A–2E comprise a schematic wiring diagram of the computer shown in FIG. 1; and FIGS. 3 and 4 are mosaics showing how FIGS. 1 and 2 are assembled to form complete drawings.

Referring now to the drawings in detail, and more particularly to FIG. 1, the reference character 11 designates a potentiometer having a slide contact 25. The slide contact 25 is mechanically connected to the stick or wheel in the cockpit of the trainer and represents the movement of the control to induce roll in the aircraft being simulated. Similarly, the reference character 12 designates a potentiometer having a slide contact 26 which is connected to the rudder pedals of the simulated aircraft, and a potentiometer 13 has a slide contact 27 which is connected to the primary control (stick or wheel) of the simulated aircraft and is moved as representative of pitch control. In addition, a fuel mixture potentiometer 14 having a slide contact 28 is connected through a threshold circuit 15 to one end of a potentiometer 16, the slide contact 29 of which represents the throttle of the simulated aircraft and is mechanically connected thereto. The slide contact 29 is connected as one input to a thrust generator 45. A potentiometer 17 has one end connected to a source of positive potential and its other end grounded and has a slide contact 30 connected to one input of a thrust generator 45 and represents the effect of the carburetor heat control in the simulated aircraft. Each of the potentiometers 11, 12 and 13 is connected across a source of direct current. One end of the series arrangement of potentiometer 14, threshold circuit 15, and potentiometer 16 is connected to one side of a source of direct current, and the other end of the series is connected to ground. A pair of resistors 18 and 19 represent the two flap conditions and are connected to contacts 22, 23 and 24 of a flap switch 21. Resistor 18 is connected across contacts 22 and 23, and resistor 19 is connected across contacts 23 and 24.

The three translational moments are computed in this computer in separate sections. The roll moment generator is designated as 31 and includes a feedback path 32, an input 33 from the slide contact 25, an input 34 from the thrust generator 45, an input 35 representative of dynamic pressure, an input 36 representative of side slip, and an input representative of the sine of the roll angle from a potentiometer 107. The roll moment generator 31 has a single output 37. The yaw moment generator 41 includes a feedback path 42, an input 43 representative of side slip, an input 44 representative of the dynamic pressure, and an input 46 from the slide contact 26. The yaw moment generator 41 has a single output 47 which contains an inverter 48. The pitch moment generator 51 has a feedback path 52, an input 53 representative of dynamic pressure, an input 54 connected to the pitch slide contact 27, an input 55 connected to the output of the thrust generator 45, an input 56 connected to the flap switch 21, and an input 57 representative of the lift coefficient. The pitch moment generator 51 has a single output 58. The lift coefficient generator 61 comprises an input 62 connected to the flap switch 21, an input 63 representative of the angle of attack, and a constant potential 64 representing an aircraft design constant. The lift coefficient generator 61 has a single output 65. The angle of attack generator 71 comprises an input 59 connected to the output of the pitch moment generator 51, and an input 73 representative of true airspeed, weight and lift.

The system considered also comprises a motion system having at least three degrees of freedom in roll, yaw and pitch. A roll motor 79 drives the trainer in roll; a yaw motor 85 drives the trainer in yaw; and a pitch motor 95 drives the trainer in pitch. The roll motor 79 is driven by a power amplifier 78 the input to which is connected by means of a line 77 to a bank generator 75 which has an input 37 from the output of the roll moment generator 31 and a second input 76. Similarly, the yaw motor 85 is driven directly by a power amplifier 84 connected to a yaw generator 81 which has two inputs 82 and 83. The pitch motor 95 is driven by a power amplifier 94 under the control of a pitch generator 91 which has two inputs also. The roll motor 79, in addition to driving the trainer itself to produce motion representative of the roll of an aircraft being simulated, also drives a plurality of potentiometers 101, 102, 103, 104, 105, 106, 107 and 108. The two sides of the potentiometers 101, 102 and 103 are connected to ground. The center tap of the potentiometer 101 is connected to the output 47 from the yaw moment generator 41, and the slide contact 111 of the potentiometer 101 is connected to the input 82 of the yaw generator 81. The center tap of potentiometer 102 is connected to a source of direct potential, and its slide contact 112 is connected through an amplifier (not shown) to the center tap of a potentiometer 121 which is driven by the pitch motor 95. The two ends of the potentiometer 121 are grounded and its slide contact 124 supplies signals to compute angle of attack. The center tap of the potentiometer 103 is connected to the output 74 of the angle of attack generator 71 which is also connected as an input to the lift coefficient generator 61. The output 58 from the pitch moment generator 51 is directly connected to one end of the potentiometer 104, and through an inverter 99 to its other end so that one end of the potentiometer 104 has the positive pitch moment applied to it and the other end has the negative pitch moment applied to it. The slide contact 114 of the potentiometer 104 is connected to the other input 83 of the yaw generator 81. The two ends of the potentiometer 105 are grounded and its center tap is connected to the output 58 from the pitch moment generator 51. The slide contact 115 of the potentiometer 105 is connected to the input 93 of the pitch generator 91. The two ends of the potentiometer 106 are connected to the two sides of the inverter 48 so that one end of the potentiometer 106 has a negative yaw moment applied to it and the other yaw moment has the positive end applied to it. The center tap of potentiometer 106 is grounded and its slide contact 116 is connected to the other input 92 of the pitch generator 91. The two ends of both of the potentiometers 107 and 108 are connected to opposite sides of a source of direct potential, and their center taps are both grounded.

The pitch motor 95 drives three potentiometers 121, 122, and 123. The connections of potentiometer 121 have already been described. Potentiometer 122 has its opposite ends connected to the two sides of a source of direct potential and its center tap is grounded. One side of potentiometer 123 is directly connected to the tachometer output of the yaw generator 81, and the other side is connected to the same point through an inverter 127. The center tap of potentiometer 123 is grounded, and its slide contact 126 is applied as an input 76 to the bank generator 75. Airspeed is developed by an airspeed generator 131 which comprises an input 132 connected to the slide contact 125 of the potentiometer 122, an input 133 connected to the slide contact 113 of the potentiometer 103, an input 134 connected to the throttle slide contact 29 through the thrust generator 45, and an input 135 connected to represent a quantity of dynamic pressure times the quantity lift coefficient squared plus a design constant representing a profile drag, quantity. The airspeed generator 131 has a single output 136 which is applied as one input to each of the feedback paths 32 of the roll moment generator 31; 42 of the yaw moment generator 41; and 52 of the pitch moment generator 51. A signal representative of altitude as well as a signal representative of a constant are applied to a subtracting network 139. The difference between these two signals is applied to one input of a multiplier 138, the other input to which comes from a squaring circuit 137, which produces the square of the airspeed. The output of the multiplying circuit 138 is the dynamic pressure which appears on line 53. The output of the lift coefficient generator 61 is applied as one input to a multiplying circuit 141, the other input to which is the dynamic pressure from the multiplier 138. In addition, the output from the lift coefficient generator 61 is squared in a squaring circuit 144 and is applied as one input to a multiplying circuit 142, one other input of which is representative of the dynamic pressure on line 53 and an input $C_{DO}$ which is profile drag and is added in. The output from the multiplier 142 is the input 135 to the airspeed generator 131.

In addition to the motion system and the three motors 79, 85 and 95 which produce the appropriate movements, several instruments (shown in FIG. 1B) are also driven from this computer. A heading instrument 151, or gyro compass, is driven from the output of the yaw power amplifier 84 through a line 86. A rate-of-climb multiplier 161 receives one input from the slide contact 113 of the potentiometer 103 and a second input from the slide contact 125 of the potentiometer 122. The output 162 from the rate-of-climb multiplier is applied directly to the input of a rate-of-climb instrument 152 and through an amplifier 163 to the input of the altimeter 153. In addition, an output from a potentiometer driven by the altimeter 153 is applied as the altitude input to the subtractor circuit 139. Also, the output of the potentiometer of the altimeter 153 is applied as one input to a difference circuit 149 where it is combined with a constant, and the difference from the circuit 149 is applied to a multiplier 164, the other input to which comes from the output 136 of the airspeed generator 131. The output 165 from the multiplier 164 is applied to the airspeed indicator 154.

The dynamic pressure and the airspeed are applied as inputs to a divider 166 which produces an output representative of dynamic pressure over airspeed. This is one term used to compute side slip and amount of bank. The output from the divider 166 is applied as one input to a multiplier 167 together with an indication of the pedal deflection from the slide 26 of potentiometer 12, and the signal representative of side slip. The product output from the multiplier 167 is applied as one of three inputs to an adder and integrator circuit 168, the other two inputs thereto being the pitch moment from the pitch moment generator 41 and the output from a divider 171. The inputs to the divider 171 are the airspeed and the potential from the slide 118 of the sine potentiometer 108. This potential from the slide 118 is representative of the sine of the roll angle. The output from divider 171 is the sine of the roll angle divided by airspeed, and this is applied to an input to the adder and integrator 168 to produce the addition of the quantities: sine of the roll angle over airspeed plus the yaw movement, plus the quantity dynamic pressure over airspeed times pedal deflection minus side slip, the entire sum integrated. The side slip from the circuit 168 is then applied to another adder and integrator circuit 173 together with pedal deflection, dynamic pressure and a feedback from a multiplier 175 which produces the product of the output from the circuit 174 and lift. The output from the circuit 173 is applied to the bank instrument 156. The turn indicator 155 receives its input from the yaw movement generator 41. A tachometer 157 is driven directly by the output of the thrust generator 45, and the roll bar 151 of the attitude gyro 158 is driven by the output of a synchro (not shown) which is driven by the roll motor amplifier 78. The pitch bar 159 receives its input from the tachometer output of the yaw generator 81 through potentiometer 122 and a damping circuit 146.

In normal flight in an aircraft, operation of the controls to cause the aircraft itself to perform one function normally modifies another operation of the plane. Rolling a plane not only causes it to bank but also to turn, and the rudder pedals operate in conjunction with the ailerons to produce a change in heading with the plane then proceeding in level flight. An increase in engine speed will produce a positive rate-of-climb, and a decrease in engine speed will cause the aircraft to descend. In simulating these operations, both the motion and the instruments contained within the simulated cockpit itself must operate as they do in a real aircraft. In developing a simulator which closely follows the operation of a vehicle, the large number of interrelated actions must be considered. Thus, in a computer which controls both the motion and the instruments, there are many interconnections among the various input control signals and responding elements which include feedback loops in which the modified output of one component is fed back to produce a further modification in the same component. The block diagram of FIG. 1 has been created to demonstrate these interrelationships without necessarily accurately illustrating the operational device.

Figure 1A:
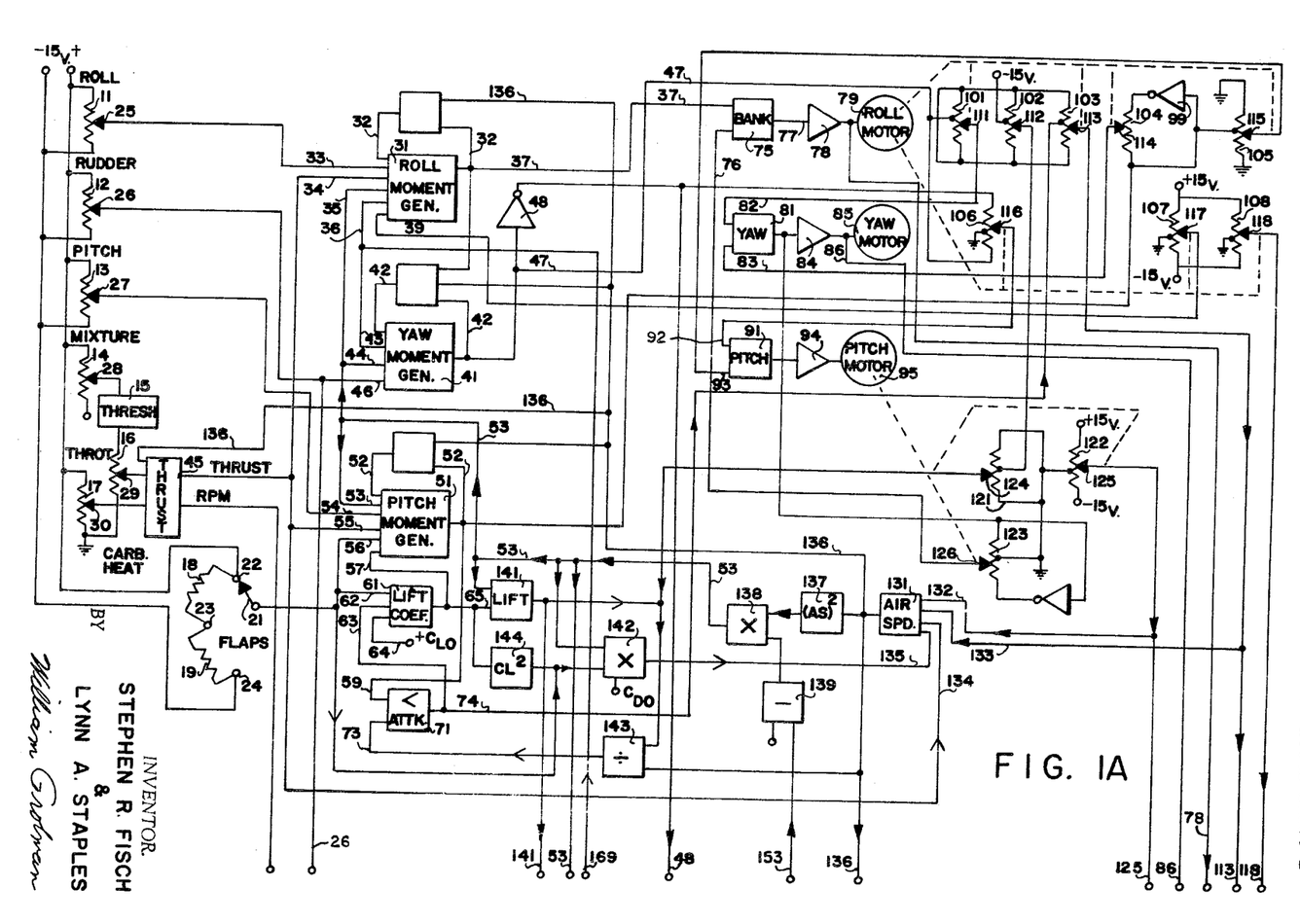
FIGS. 1A and 1B comprise a block diagram of the computer of this invention.
Figures 1B, 5:
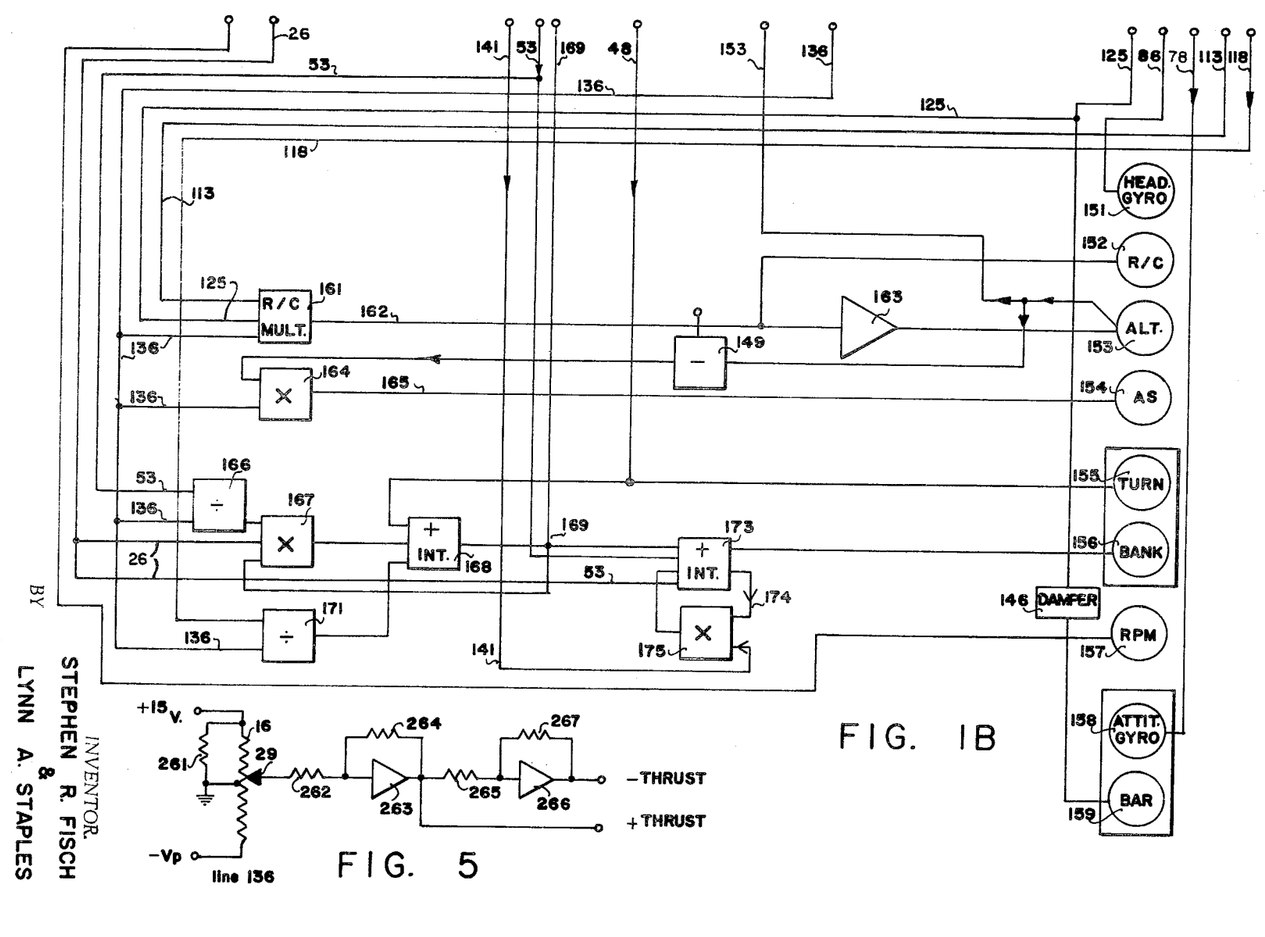

Devices connected to the basic controls of the aircraft are shown along the left-hand edge of FIG. 1A. These are represented by potentiometers 11, 12, 13, 14, 16 and 17 and by the flap switch 21 with its associated resistors 18 and 19. In the actual airplane, the control levers, wheels, pedals, and switches are mechanically connected to the various control surfaces in the plane itself. Since it is one object of this invention to provide an all-electric system, the same aircraft controls, levers, wheels and switches in the simulator are connected to electrical components. Assuming for this discussion that the simulated aircraft contains a wheel which can rotate and which can also be moved forward and aft, each of the two motions must develop electrical signals separately and independently of each other, and each electrical signal must be representative of its own particular operation. Potentiometer 11, having slide contact 25, is connected across a source of direct current. The approximate center of the potentiometer 11 can be considered a home or neutral position, and, if as shown in FIG. 1, one end of the potentiometer 11 is connected to a source of plus 15 volts and the other end is connected to a source of minus 15 volts, then the center of the potentiometer 11 should be zero volt. This would ordinarily be the home position. The slide contact 25 is mechanically connected to the wheel so that as the wheel is rotated in one direction, the slide contact 25 is moved in one direction; and as the wheel is rotated in the other direction, the slide contact 25 moves in the other direction. Therefore, when the slide contact 25 is in the center of the potentiometer 11, it is in its home or zero position. Voltages appearing at the slide contact 25 by reason of the movement of the wheel will indicate not only the amount of movement, but, by the polarity of the signal developed, the direction of the movement as well. Although the above discussion is directed to potentiometer 11 and slide contact 25, it similarly holds true for the potentiometers 12, 13, 14, 16 and 17, and their slide contacts.

The following terms will be used at times during the discussion which follows and may also be found on the drawings:

$\delta_{sa}$—Wheel deflection, lateral for roll
$\delta_{se}$—Wheel deflection, longitudinal for pitch
$\delta_{pr}$—Pedal deflection, rudder
$P_a$—Roll moment
$R_a$—Heading or yaw moment
$Q_a$—Pitch moment
$\delta_t$—Throttle
$\beta$—Sideslip
$q$—Dynamic pressure
$V_p$—True airspeed
$\delta_{fw}$—Wing flaps
$C_L$—Lift coefficient
$\alpha$—Angle of attack
$h$—Altitude
$R/C$—Rate-of-climb
$h_f$—Field elevation
$T_{oa}$—Outside air temperature
$g$—Gravity
$\phi$—Angle of roll
$\theta$—Angle of pitch
$\psi$—Heading
$\lambda$—Ball angle
$\delta_{ch}$—Carburetor heat The roll moment is calculated in accordance with the following equation:

$$P_a = \int [-K_1\delta_t + q(-K_2\delta_{sa} - K_3\beta) + q/V_p(K_4R_a - K_5P_a) + K_6\phi]dt$$

In the discussion of how the apparatus of this invention operates, the constants such as $k_1$–$k_5$ of the roll moment equation set forth above will be ignored. Since the computer of this invention operates on potentials, constants can be readily inserted merely by applying a fixed potential through a resistor. For this reason, only the variables will be discussed, and it will be assumed that each of the variables is modified by an appropriate constant without showing where or how it is obtained. Since the block diagram of FIGS. 1A–1B is but a broad showing of the entire system to present an over-all view, the roll moment generator 31 is shown merely as a block witth the appropriate inputs applied to compute the roll moment. The feedback path 32 helps stabilize the operation of the roll moment generator 31 and also provides a path for the performance of division. In this apparatus, as explained in detail below, division is performed in the feedback paths of the various generators. In the roll moment equation, the dynamic pressure is shown divided by the true airspeed ($q/V_p$). The inputs to the generator 31 are so arranged that dynamic pressure is applied to an input which is fed back, and the airspeed is applied to the feedback path. This produces the quotient desired. As mentioned above, when an airplane rolls, it also turns so that both turning and banking are interrelated. The information from which the roll moment is calculated is supplied by the position of the slide contact 25 on the potentiometer 11 to produce a voltage which is proportional to the rotation of the wheel (lateral deflection). The amount of throttle is indicated by the position of the slide contact 29 on the potentiometer 16, from which a potential is applied to the input 34 of the roll moment generator 31 through a thrust generator 45. The dynamic pressure is computed from the airspeed and the altitude in the multiplier 138 and is applied to the input 35. And side slip from the adder and integrator 168 is applied to the input 36. The roll moment generator 31 must then subtract the side slip $\beta$ from the potential derived from the slide contact 25 $\delta_{sa}$, and then multiply the dicerence so obtained by the dynamic pressure $q$. It must also divide the dynamic pressure $q$ by the airspeed $V_p$ (as described above) and multiply the quotient by the difference between the roll and heading moments $R_a - P_a$. The roll itself is applied from the slide contact 117 of the potentiometer 107.

The slide contact 117 is driven by the roll motor 79, so that the position of the slide 117 on the potentiometer 107 with respect to its center is proportional to the amount of roll developed by the roll motor 79. In addition, the roll moment generator 31 must integrate the sum of the above quantities to develop the actual roll moment. The roll moment is applied along line 37 to the input of the bank generator 75 and modifies the output thereof to determine the power and the direction of the energy applied from the power amplifier 78 to the roll motor 79. The above description of the roll moment generator indicates how closed loops are achieved in this system. The output from the roll moment generator 31 is fed back through the feedback loop 32 in which it is modified by other quantities to help in controlling the computer output. In addition, the output of the roll moment generator 31 helps determine the amount of roll to be achieved by the motor 79, and one of the inputs to the roll moment generator is from the potentiometer 107 whose slide contact 117 is driven by the roll motor. So there is a second complete loop to close the circuit and help provide stabilization.

The yaw moment generator operates in a manner similar to the roll moment generator. Yaw moment is developed in accordance with the following equation:

$$R_a = \int [q(-k_7\delta_{sa} - K_8\delta_{pr} + K_9\beta) + q/V_p(-k_{10}P_a - K_{11}R_a) - K_{12}\delta_{pr}]dt$$

To accomplish this, the yaw moment generator 41 receives on its input 44 a signal proportional to the dynamic pressure along the line 53 from the output of the multiplier 138. The pedal deflection is received on line 46 from the slide contact 26 of the pedal potentiometer 12. These quantities produce one term. A feedback path 42 combines the yaw moment from the output of the generator 41, the roll moment from the output of the generator 31, and true airspeed along line 136 from the output of the airspeed generator 131 to produce an input to the yaw moment generator 41 which is proportional to $q/V_p$. These quantities, together with the dynamic pressure which is applied to the input 44, produce the second term. The output from the yaw moment generator 41 is applied along the line 47 to the input of an inverter 48. The input to the inverter 48 is positive yaw moment, and the output of the inverter 48 is negative yaw moment, both of which are used in later described apparatus.

The pitch moment generator 51 produces the pitch moment by combining four terms in accordance with the equation:

$$Q_a = \int [k_{13}\delta_t + q(-k_{14} - k_{15}\delta_{se} + k_{16}\delta_{fw} - k_{17}C_L) - q/V_p k_{18}Q_a k_{19}{}^*\theta] dt$$

*Term used only when on the ground.

To accomplish this, the pitch moment generator has the dynamic pressure $q$ applied to the input terminal 53. The throttle deflection is applied through the thrust generator 45 to the input 55 from the slide contact 29 from the throttle potentiometer 61. The longitudinal wheel deflection is applied from the slide contact 27 of the pitch potentiometer 13 to the input 54, and a signal representative of the flap condition is applied to input 56 from the flap switch 21. The lift coefficient generated by the generator 61 is applied to the input 57. The feedback path 52 receives the input of true airspeed from the airspeed generator 131 and also the pitch moment from the output of the generator 51. Thus, all of the required factors are applied to the pitch moment generator 51 to produce an output on line 58.

The lift coefficient is generated by the generator 61 which receives an input at 62 proportional to the flap condition from switch 21, and on 63 an input proportional to the angle of attack from the angle of attack generator 71. The lift coefficient is the summation of these two terms plus a constant. The output from the lift coefficient generator 61 is applied to the input of a multiplier 141 together with an input representative of dynamic pressure to produce an output representative of the actual lift, and this is added to the product of cos roll times cos pitch which is applied as one input to a divider 143 where it is divided by airspeed. The output from the divider 143 is applied as an input 173 to the angle of attack generator 171. Another input 59 is applied from the pitch moment generator 51. Angle of attack is determined in accordance with the equation:

$$\alpha = \int k_{20}Q_a + \frac{(-k_{21}\text{ Lift} + K_{22}\cos\phi\cos\theta)}{V_p} dt$$

The cosine of the pitch and the cosine of the roll are derived from the potentiometers 121 and 102, respectively. The two ends of both of the potentiometers 102 and 121 are grounded and a negative potential is applied to the center tap of potentiometer 102. Thus, current flows in opposite directions from the center of the potentiometer 102 towards the two ends. The potential is taken from the potentiometer 102 by means of the slide contact 112 and is applied to the center tap of the potentiometer 121. The position of the slide contact 112 is determined by the position of the roll motor 79 which drives it. In this way, the potential applied to the center tap of the potentiometer 121 is proportional to the acual roll position. The slide 124 of the potentiometer 121 is driven by the pitch motor. Since both potentiometers 102 and 121 are wound as cosine potentiometers, the output potentials are proportional to the cosine of the position of the slide contacts. The cosine of the roll is applied to the center tap of the potentiometer which develops the cosine of the pitch and the output from the slide contact 124, which is applied to the input of the divider 143 together with the lift, is a signal proportional to the product of the cosine of the roll and the cosine of the pitch.

In this equipment, true airspeed is computed by summing four terms and integrating the total in accordance with the equation:

$$V_p = \int -K_{23}\sin\theta + K_{24}\alpha\cos\phi + K_{25}\delta_T + q(-K_{26}\delta_{fw} + K_{27} - K_{23}C_2{}^2)dt$$

The airspeed generator 131 receives on an input 134 a signal representative of the throttle deflection from the slide contact 29 of the potentiometer 16 applied through the thrust generator 45. A multiplier 142 produces the product of the dynamic pressure and the sum of the flap condition and the profile drag $C_{DO}$ as well as the square of the lift coefficient. The lift coefficient is squared by a squaring circuit 144. The output of the multiplier 142 is applied as an input 135 of the airspeed generator 131. Actually, to determine airspeed, a term which is the algebraic sum of the sine of the pitch minus the angle of attack times the cosine of pitch times the cosine of roll should be used. However, since we can assume that in most simulators which will utilize a computer of this type, the pitch is limited to 30° or less, the cosine of the pitch angle is sufficiently close to 1 to be eliminated in favor of using 1 as an approximation. Therefore, to generate the above term, the cosine of pitch is replaced by 1 and the term becomes the sine of the pitch less the angle of attack times the cosine of roll. This is achieved in the apparatus of FIG. 1 by using the potentiometer 122 as a sine potentiometer to derive $\sin\theta$, and the potentiometer 103 as a cosine potentiometer which produces $\cos\phi$. The two ends of the potentiometer 103 are grounded and the output from the angle of attack generator 71 is applied to its center tap. Therefore, as the slide contact 113 is moved by the roll motor, the potential which is applied to the slide contact 113 and thereby to the input 133 of the airspeed generator 131 is proportional to $\alpha\cos\phi$. The potentiometer 122 has a source of positive potential applied to one end and to its other end a source of negative potential, and it has its center tap grounded. The slide contact 125 is driven by the pitch motor 95 and derives from the potentiometer 122 an output potential representative of sin $\theta$. This is applied to the input 132 of the airspeed generator 131. Should the approximation made above not be true because of a greater pitch angle, then an additional potentiometer will be required to produce cos $\theta$. The input 135 to the airspeed generator 131 is derived from a multiplier 142 which produces the product of the dynamic pressure and the sum of the flap condition derived from the position of the switch 21 and the lift coefficient squared. The signal representative of throttle position is derived from the slide contact 29 and is applied to an input 134 through the thrust generator 45. The integration of the sum of these terms is produced in the airspeed generator 131.

As indicated above, during the recitations of the connections among the various elements, the system of this invention contemplates the use of pitch, roll and yaw motors to provide motion for the trainer itself. In addition, the motors also drive potentiometers from which are derived operators in the computations of the system. For this reason, the motors 79, 85 and 95 have been symbolically shown as part of the computer circuit. The actual drive circuitry, shown here as amplifiers 78, 84 and 94, for the motors themselves are not shown in detail in this specification since they are the subject of another copending application filed in the name of Lynn A. Staples and entitled "Motion System Electrical Controls." Considering, for example, the roll motor 79, a bank signal generator 75 is fed with the output from the roll moment generator 31 and from a signal proportional to the sine of the pitch derived from the potentiometer 123. The information from the potentiometer 123 is required in order to translate the roll information from the axis of the aircraft being simulated to an axis horizontal to the earth. Since pitch does modify the relationship between these two axes, the pitch information is supplied to the bank generator 75. The roll motor 79 drives the slide contacts 111, 112, 113, 114, 115, 116, 117 and 118 of the potentiometers 101–108 to modify the potentials on these slide contacts by the roll angle of the simulator. The bank angle of an aircraft affects both the yaw and the pitch. For this reason, the inputs to the yaw generator 81 are derived from the slide contact 111 of the potentiometer 101 and from the slide contact 114 from the potentiometer 104. The two ends of the potentiometer 104 have applied to them a positive pitch moment and a negative pitch moment. Thus, the potential on the slide contact 114 which is supplied to the input of the yaw generator 81 is proportional to the pitch moment times the cosine of the roll angle. The other input on line 82 is proportional to the yaw moment times the sine of the roll angle. In a similar manner, the pitch generator 91 has applied to one input 92 a potential from the slide contact 116. The potentiometer 106 has the positive yaw moment applied to one side and a negative yaw moment applied to another. Therefore, the potential on the slide contact 116 is proportional to the yaw moment times the sine of the roll angle. The input signal applied to the input 93 of the pitch generator 91 is derived from the slide contact 115 of the potentiometer 105 which has both of its ends grounded and the pitch moment applied to the center tap. The signal appearing on the slide contact 115 and applied to the input 93 is proportional to the pitch moment times the cosine of the roll angle. The slide contacts 124, 125 and 126 of the potentiometers 121, 122 and 123 are driven by the pitch motor 95. In this manner, potentials are derived which are proportional to the sine and the cosine of the pitch angle as well.

As mentioned above, one of the primary functions of the computer in a vehicle simulator is to drive those instruments which are normally available in the vehicle itself in such a manner that they realistically simulate the operation of the simulated vehicle. Considering a typical small aircraft as an example, a reasonable complement of instruments which should be simulated include the heading gyro 151, the rate-of-climb instrument 152, an altimeter 153, an airspeed indicator 154, turn and bank indicators 155 and 156, a tachometer 157, an attitude gyro 158 with a horizon bar 159 and a roll bar 160. Each of these instruments is driven from an appropriate portion of the circuit. The heading gyroscope 151 is symbolically shown driven directly from the output of the yaw power amplifier through a line 86. Thus, as the yaw motor 85 is driven to change the heading of the simulator itself, so is the heading gyroscope 151.

A rate-of-climb multiplier 161 is fed with three input signals including the airspeed from the airspeed generator 131 through a line 136. A second input is derived from the slide contact 113 of the potentiometer 103 and represents the angle of attack times the cosine of the roll angle. The two ends of the potentiometer 103 are grounded and the output from the angle of attack generator 71 is applied to the center tap of that potentiometer. The potentiometer 103 is wound as a sine function, and the movement of the slide contact 113 by the roll motor 79 generates the term mentioned. A third input to the rate-of-climb multiplier 161 is derived from the slide contact 125 of the potentiometer 122 which derives a voltage proportional to the sine of the pitch angle. Thus, the output on line 162 from the rate-of-climb multiplier 161 is represented by the equation:

$$R/C = V_\text{p}(\sin \theta - \alpha \cos \phi)$$

Since, at any particular throttle setting or thrust condition of the motor, both the pitch angle and the roll angle will affect the rate at which the aircraft is rising or descending, all of these factors must be taken into consideration. The output from the rate-of-climb multiplier 161 is applied directly to the rate-of-climb instrument 152 and through an amplifier 163 to an altimeter 153 which integrates it. The altitude from the altimeter potentiometer is provided to a difference circuit 139 in which it is combined algebraically with a constant, the difference to be multiplied in a multiplier 138 with the square of the airspeed to compute the dynamic pressure which appears on line 53.

Since the airspeed as displayed on an airspeed instrument is modified by the altitude at which the airplane is flying, an airspeed multiplier 164 has applied to it as one input the airspeed from line 136 and the difference between a constant and the altitude from the output of the altimeter potentiometer. The product of these two factors is applied through a line 165 to the airspeed indicator 154. The bank and turn indicator really comprises two separate instruments, a turn indicator 155 and a bank indicator 156. The turn indicator 155 is driven directly by the signal on line 48 which is the negative output from the yaw moment generator. The negative yaw moment is also applied as one input to an adder and integrator 168. Another input to the integrator 168 comes from a multiplier 167 which has applied to its input a potential from the slide contact 118 of the potentiometer 108. The potentiometer 108 has opposite ends connected to positive and negative potentials and its center tap is grounded. Therefore, the potential derived at the slide contact 118 is proportional to the sine of the roll angle. Another input to the multiplier 167 is derived from the rudder potentiometer 12 and the slide contact 26. And the third input is applied from a divider 166 whose two inputs are the airspeed from line 136 and the dynamic pressure from line 53 to produce an output which is equal to the dynamic pressure over airspeed ($c/V_\text{p}$). A third input to the adder and integrator 168 is derived from divider 171 which has two inputs applied, one input is derived from the slide contact 117 of the potentiometer 107 to produce a potential proportional to the sine of the roll angle and the other input is the airspeed from line 136. The output from the adder and integrator circuit 168 is the side slip which appears on line 169 and is applied as one input to compute the roll moments and the yaw moments. The side slip forms one input to another integrator and adder 173 which has a second input from line 53 representative of the dynamic pressure and a third input from a feedback loop 174. The feedback loop 174 includes a multiplier 175 to which the output of the adder and integrator 173 is applied, as well as the lift from line 141. The output of the adder and integrator 173 is applied to the bank instrument 156.

The tachometer 157 indicates the engine r.p.m. and derives its input directly from the thrust generator 45. The attitude gyroscope 158 is symbolically shown fed directly from the output of the roll power amplifier 78, and the horizon bar 159 is similarly shown fed directly from the output of the pitch power amplifier 94.

The block diagrams of FIGS. 1A and 1B are illustrative of the basic philosophy behind the analog computer of this invention, and the blocks shown therein are generalized versions of what the individual components of the over-all computer may be. The block diagram has been simplified in order to render the explanation of the over-all organization of this computer as simple as possible without confusing the discussion and the drawings by the showing and describing of unnecessary details—unnecessary for the over-all explanation. For this reason, there may, at times, be some differences between details of the system shown in the block diagram of FIGS. 1A and 1B and the details of the schematic diagram shown in FIGS. 2A–2E. In order to simplify the understanding of the schematic diagram, FIG. 4 has been provided to show the relationships of the several sheets of drawings which comprise FIGS. 2A–2E. When the various sheets are arranged according to the mosaic diagram of FIG. 4, those lines which pass from one sheet to the next should be aligned with each other so that the entire circuit can be followed with ease.

To meet the basic economic requirements of a circuit of this nature while achieving the desired mathematical results and high reliability of operation, the individual elements of the circuit have been standardized to a high degree. Where possible, the same type of computation is performed by the same type of elements. This simplifies the maintenance problem and reduces the inventory of necessary spare parts. Since the over-all operation of the system has been described above in connection with the block diagram of FIGS. 1A and 1B, the explanation of the schematic diagram will be kept as short as possible. This will be accomplished, in part, by designating as many portions of the schematic diagrams of FIGS. 2A–2E as possible with the same general designations used in FIGS. 1A and 1B. In addition, since similar operations are accomplished in this system by similar devices, wherever possible a single explanation of one such device will be given and will serve as the explanation for all similar devices. In this manner, a complete description of the entire apparatus will be achieved without unduly lengthening the specification by unnecessary repetition.

Figure 2A:
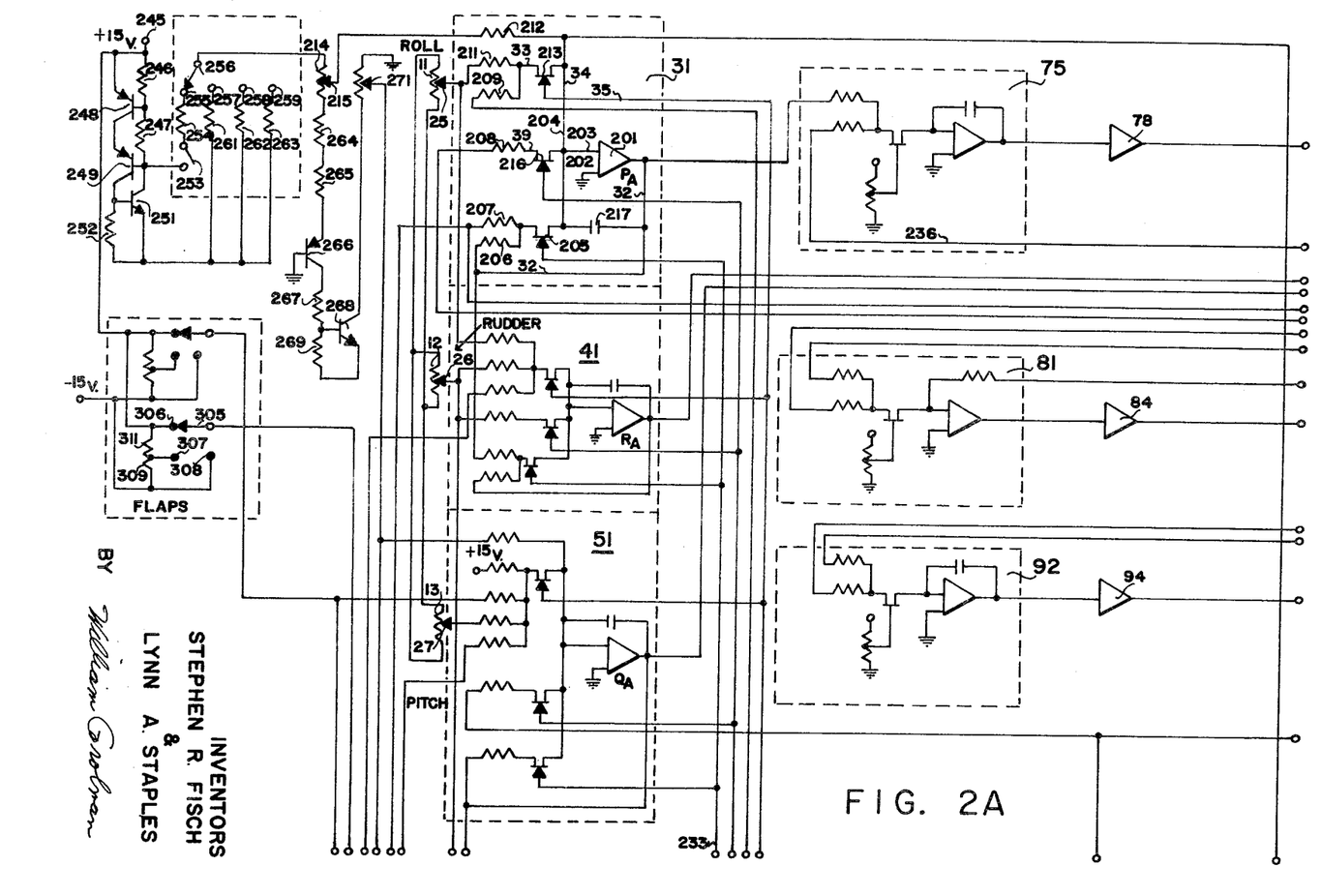

The roll moment generator 31, the yaw moment generator 41 and the pitch moment generator 51 are all shown in schematic form on FIG. 2A. The roll moment generator 31 comprises an operational amplifier 201 which has one of its inputs 202 grounded and the other input 203 connected to a common bus bar 204. As shown in FIG. 1A, the roll moment generator 31 has a plurality of inputs. These inputs are applied to the operational amplifier 201 by means of the bus bar 204. The input corresponding to the input from the roll potentiometer 11 slide contact 25 is applied through an input resistor 211 to the source electrode of a field effect transistor 213, the drain electrode of which is connected to the bus bar 204. The throttle input is applied from a potentiometer 214 slide contact 215 through an input resistor 212 to the bus bar 204. Side slip is applied through an input resistor 209 also to the source electrode of the field effect transistor 213. This corresponds to the input 36. The input 39 which corresponds to the sine of the roll angle is applied through an input resistor 208 to the source electrode of a field effect transistor 216, the drain electrode of which is connected to the bus bar 204. The feedback path 32 is applied from the output of the operational amplifier 201 across an integrating capacitor 217 and also through an input resistor 206 to the source electrode of a field effect transistor 205, the drain electrode of which is connected to the bus bar 204. The roll moment is computed by integrating a plurality of terms. One of the terms is the heading moment less the roll moment multiplied by the quotient of the dynamic pressure over the airspeed. The dynamic pressure over the airspeed is computed by a circuit shown on FIG. 2C and identified by the reference character 221. This circuit comprises an operational amplifier 222 having an input resistor 223 which is connected to the output of the circuit 224 which computes the dynamic pressure. Thus, the dynamic pressure is applied to the input resistor 223. The output of amplifier 222 is applied to the source electrode of a field effect transistor 225, the gate electrode of which is connected to a line 226 which comes from the output of the airspeed computing circuit 227 on FIG. 2B.

Figure 2B:
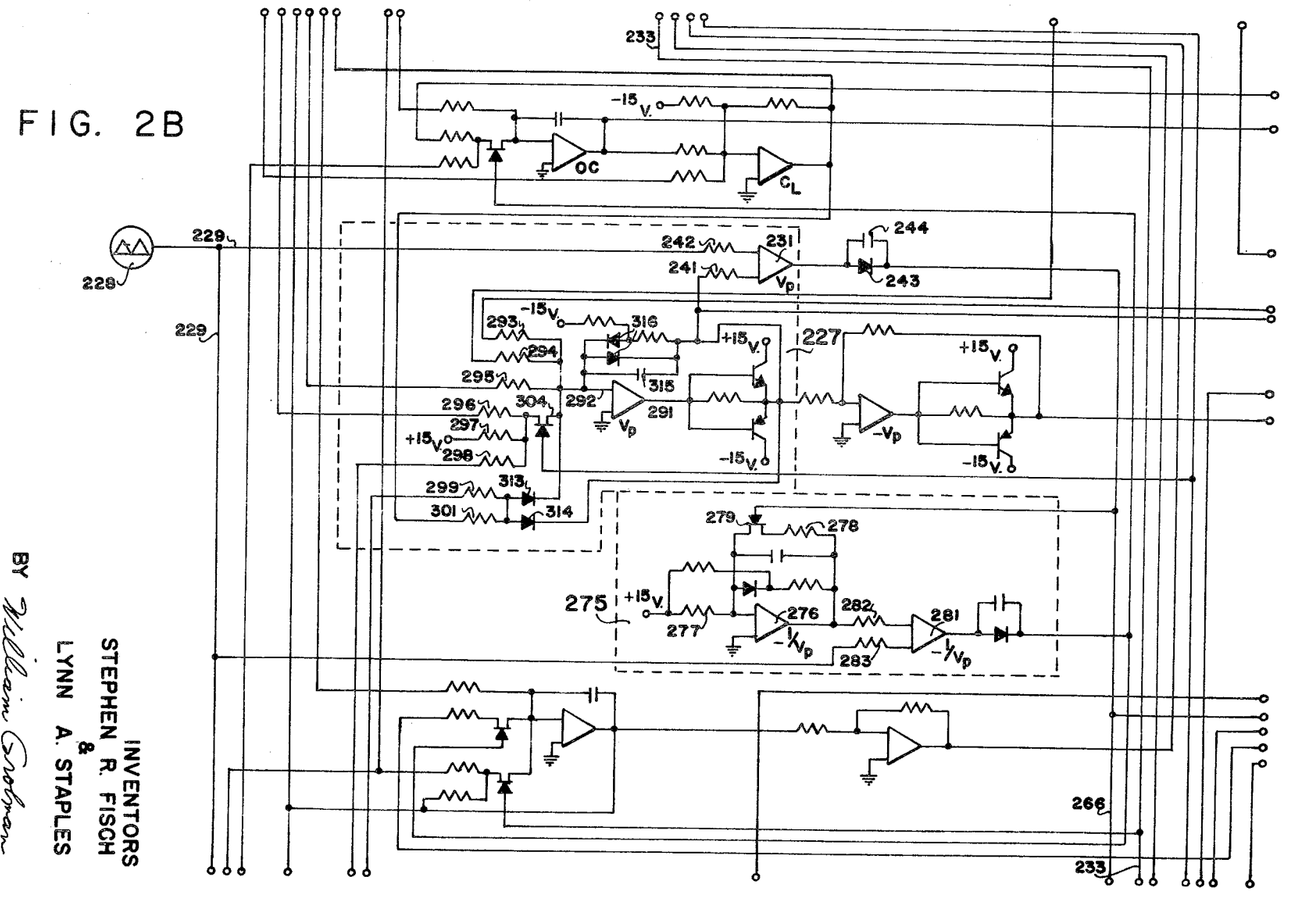
Figure 2C:
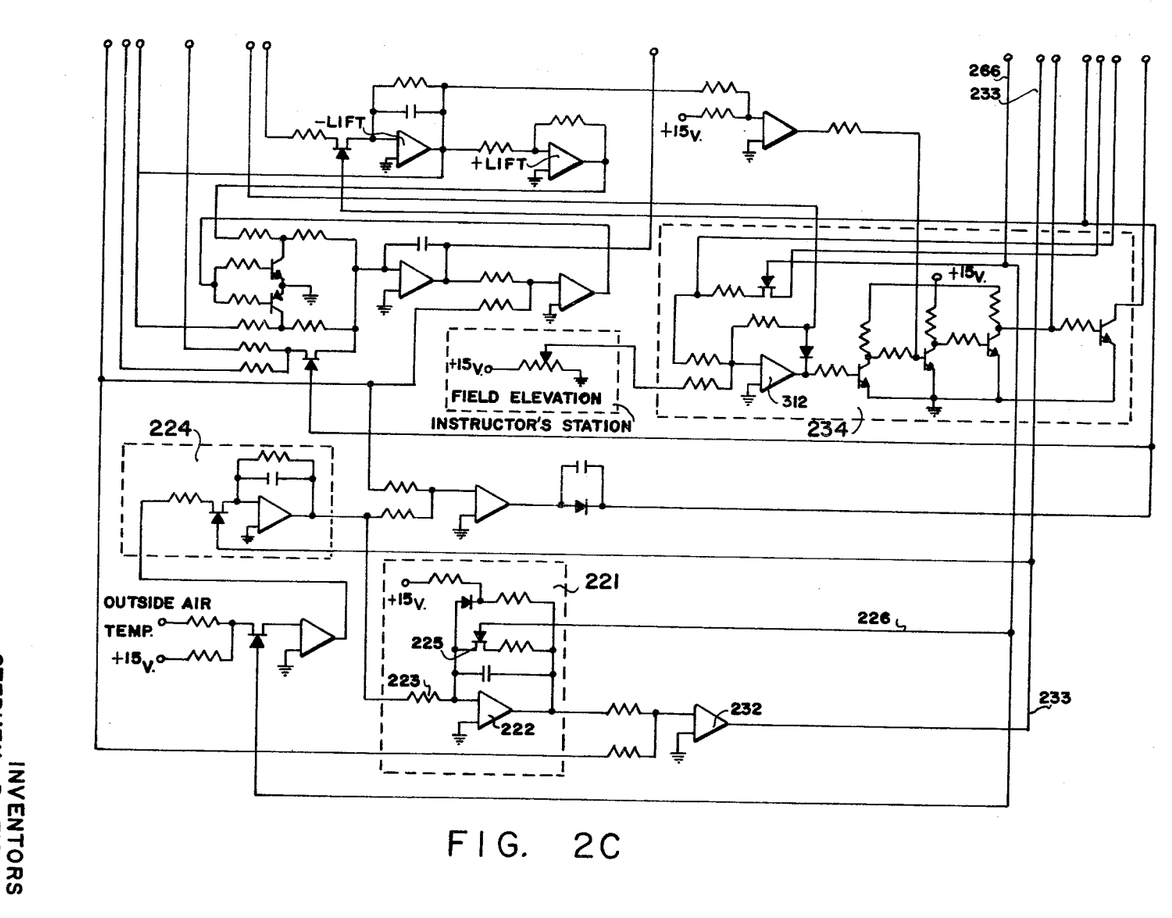

It has been found that field effect transistors can be used to multiply and divide quantities when one quantity is introduced on the source electrode and the other is applied to the gate electrode. However, for suitable operation of the field effect transistors to accomplish multiplication or division, steady-state potentials cannot be applied to the gate electrode. For this reason, a source 228 of triangular waves is provided as shown in FIG. 2B. The output of the source 228 is applied through a line 229 to the input of an operational amplifier 231 to which the output from the airspeed circuit is also applied. This produces an output from the operational amplifier 231 on line 226 which is a time division of the potential which is proportional to the airspeed. When this is applied to the gate electrode of the field effect transistor 225 and the source-drain circuit of that transistor is in the feedback path of the operational amplifier 222 (FIG. 2C) so that the potential proportional to the dynamic pressure which is applied to the input 223 of the amplifier 222 is fed back through the field effect transistor 225, the effect of the circuit is to produce an output proportional to the dynamic pressure divided by the airspeed. This is applied to the input of an amplifier 232, and the output from the source 228 is also applied to the amplifier 232. The output of the amplifier 232 which appears on line 233 is applied to the gate electrode of the field effect transistor 205. Thus, the field effect transistor 205, which is in the feedback path from the roll moment generator, has applied to it a quantity proportional to the dynamic pressure over the airspeed. The roll moment is applied through the input resistor 206 to the source electrode of the transistor 205 (in 31 on FIG. 2A), and the negative heading moment is applied through the input resistor 206 to the same source electrode of the transistor 205. Therefore, applied to the bus bar 20 from the transistor 205 is the quantity roll moment less yaw moment times the quantity dynamic pressure over airspeed. The lateral deflection of the wheel is derived from the potentiometer 11 by the slide contact 25 as explained earlier and is applied through an input resistor 211 to the source electrode of the field effect transistor 213. A value proportional to the side slip is applied to the input resistor 209 of the source electrode of the field effect transistor 213. Since the dynamic pressure is applied to the gate electrode of transistor 213, the net result is that the field effect transistor 213 computes the term wheel deflection less the side slip quantity times the dynamic pressure. This is directly applied to the bus bar 204 as is the throttle deflection derived from the slide contact 215 of the throttle potentiometer 214. The field effect transistor 216 computes a complicated term which depends upon many factors. There is applied through the input resistor 208 to the source electrode of the transistor 216 a signal which is derived from a potentiometer 107 and is proportional to the sine of the roll. Applied to the gate electrode of the field effect transistor 216 is a signal which is available when the simulated aircraft is on the ground and which renders transistor 216 conductive when it is present. This signal is generated when either the lift is less than the weight or when the simulated altitude is less than the inserted field elevation. The net result is that there is applied to the bus 204 from the transistor 216 a quantity which is proportional to the product of the roll angle and the relationship between the lift and weight. These four terms are added together on the input bus 204 and are applied to the input 203 of the operational amplifier 201. The operational amplifier 201, operating in conjunction with the capacitor 217 which is connected across it, integrates the sum of these four terms to produce an output proportional to the roll moment at any time.

The output from the operational amplifier 201 is applied along the output line 235 to the input of the bank generator 75. The output of the bank generator 75 energizes the power amplifier 78 which drives the roll motor 79 shown in FIG. 2D. Since the quantities considered heretofore are all related to the axis of the aircraft, and, since for proper navigation and proper response, this information must be translated to the horizon, the bank generator 75 receives the roll moment from line 235 which is in relation to the aircraft axis and also an input on line 236 which is derived from a potentiometer 123 by means of the slide contact 126. The potentiometer slide 126 is driven by the pitch motor 95 and is energized by the rate of turning as produced by the heading generator 81. This signal applied to the other input of the bank generator 75 produces an output signal which relates the roll moment to the axes of the earth rather than those of the aircraft itself. Interposed between the output of the power amplifier 78 and the roll motor 79 are a pair of switches 237 and 238 which are physically mounted on an instructor's console or panel. The switch 237 connects the roll motor 79 to the output of the power amplifier 78. The switch 238 connects a source of positive potential to a solenoid 239, which maintains a spring loaded brake (not shown) on the motor 79 open whenever the solenoid 239 is energized. When the switches 237 and 238 are opened, the motor 79 loses its power as does the solenoid 239. The motor 79 stops running, and the spring loaded brake clamps the motor 79 to keep it at rest.

As mentioned above, one of the features of this invention is the organization of an analog computer which does not use servo motors. A discussion of the manner of performing the arithmetic functions is in order. Addition is normally accomplished merely by applying signals to a plurality of resistors which have a common terminal. Referring to the roll moment generator 31, algebraic addition is accomplished through the two resistors 211 and 209 and also through the two resistors 206 and 207. Subtraction is, of course, accomplished by inverting one of the quantities and adding. Thus, the resistors provide algebraic addition. Multiplication is accomplished by the field effect transistors. A potential whose amplitude is representative of one of the quantities to be multiplied is applied to the source electrode of a field effect transistor. A rectangular wave whose width is representative of the other quantity is applied to the gate electrode of the same field effect transistor. The rectangular wave turns the transistor on and off, thereby modulating the amplitude signal by a timed amount which is representative of the other quantity. The output of the transistor is a rectangular wave whose width of pulse represents one quantity and whose amplitude represents the other. When the rectangular wave is integrated, the result, which is equivalent to the area under the rectangular wave, is proportional to the product of the two quantities. Integration is accomplished by operational amplifiers. An operational amplifier, at least as it is considered in this specification, is an amplifier which has a feedback path so designed as to give the amplier the curve or function desired. Two interesting and concise volumes which discuss some of the theory and application of operational amplifiers are "Handbook of Operational Amplifier Applications" published in 1963, and "Handbook of Operational Amplifier Active RC Networks" published in 1966, both volumes published by Burr-Brown Research Corporation, Tucson, Ariz. Generally speaking, when an operational amplifier in this specification is used for integration, the feedback path will comprise a single capacitor. However, in order to achieve the desired results, an operational amplifier may have a plurality of parallel feedback paths at least one of which may be an integrating path. For division, the same technique is used that is used in multiplication. However, the field effect transistor which accomplishes the multiplication, rather than being placed in the input of the operational amplifier, is placed in its feedback path. Since the feedback path is degenerative, its affect is to reduce the amount of the input signal. If this reduction is accomplished by means of rectangular pulses and the interval of time during which the field effect transistor is conductive can be determined by the width of the rectangular pulses, then the input signal is being reduced by a factor proportional to the width of the pulses. This is effective division.

The oscillator shown in FIG. 2B as a circle 228 generates triangular waves. These triangular waves are applied to a plurality of circuits known as time division circuits which convert the triangular waves into rectangular waves whose width is proportional to a piece of information. Consider, for example, the amplifier designated 231 on FIG. 2B. The amplifier 231 has two inputs, one of which is connected through a resistor 241 from the output of the airspeed generator 227, and the other of which is applied through a resistor 242 from the output of the source 228 of triangular waves. The amplifier 231 is a differential amplifier which produces an output only when the triangular wave equals or surpasses the other input signal in amplitude. Thus, so long as the triangular wave is higher in amplitude than the signal representative of airspeed, the amplifier 231 conducts. When, however, the triangular wave drops down to the same amplitude as the signal representative of airspeed, then the amplifier 231 stop conducting. The amplifier 231 remains non-conductive until the value of the triangular wave signal again rises to the amplitude of the airspeed signal. Thus, the output from the amplifier 231 comprises rectangular pulses which represent a period of time during which the amplifier is conductive and a period of time representative of the time when the amplifier is non-conductive. The width of these two rectangular pulses is dependent upon the relative amplitude of the signal input of the airspeed generator 227. On the output of the amplifier 231 is a diode 243 and a capacitor 244. These two elements serve to stabilize the output pulses from the amplifier 231. The time division pulses which are representative of a particular quantity, in this case airspeed, are then applied to the gate electrodes of a plurality of field effect transistors throughout the computer. This is the signal which represents the divisor or multiplier.

It was mentioned above that the block diagram of FIGS. 1A and 1B and this schematic diagram of FIGS. 2A–2E are representative of the manner in which a computer utilizing the principles of this invention can be constructed, and that differences do exist between what is shown in the two diagrams. A comparison of FIGS. 1A and 2A will point out this fact. FIG. 1A sets forth a broad showing of one manner in which the controls of an aircraft or other vehicle can be used to generate electrical signals which provide the basis of some of the computations in this computer. For example, three potentiometers 11, 12 and 13, labeled roll, rudder and pitch, are shown in FIG. 1A. These same potentiometers bearing the same numbers are also shown in FIG. 2A. In FIG. 1A a mixture potentiometer 14 was shown. This fed a signal to a threshold circuit 15 which was placed in series with the throttle potentiometer 16. In FIG. 2A, two throttle potentiometers 214 and 271 are shown. These two potentiometers are in series between a source of 15 volts and ground. The source of positive potential, which would be connected to the input terminal 245, is applied in series with the parallel arrangement of resistors 246 and 247 which are in parallel with transistors 248, 249 and 251. This arrangement of resistors and transistors, including another resistor 252, comprises a regulating circuit. Should the potential applied to the input terminal 245 vary, the current flowing through the resistors 246 and 247 will also vary. This will cause changes in the potential drop across those resistors and changes in the bias potential on the transistors 248 and 249, causing a change in conduction through that branch of the circuit. This will modify the potential drop across the resistor 252 to change the conduction through the transistor 251. The entire arrangement is so organized as the oppose changes in applied potential. A master switch 253 is connected to the junction of the resistor 247 and the transistor 251 and applies potential, when it is closed, to a resistor 254. The other end of the resistor 254 is connected to a stationary contact 255 of a switch 256. This is the start position of the ignition switch 256. The switch 256 also includes contacts 257, 258 and 259. A resistor 261 is connected in series with the contact 257; a resistor 262 is connected in series with the contact 258; and a resistor 263 is connected in series with a contact 259. The other ends of the resistors 261, 262 and 263 are connected together and to the junction of the resistor 252 and the transistor 251. Thus, the other ends of the three resistors 261–263 receive potential from the input terminal 245 through the regulating arrangement mentioned heretofore.

The switch 256 is the ignition switch and has four positions. When the switch contacts the contact 255, the motor can be started. Then it is switched over to contact 257 which is the left-hand magneto, or to 258 which is the right-hand magneto, or to 259 which represents both magnetos. The resistors 261 and 262 should be of the same valve, but the resistor 263 should be of a lower value so that when the ignition switch is in the two-magneto position, a larger current is applied through it. The switch 256 is connected to one end of one of the throttle potentiometers 214. The potentiometer 214 is connected in series with resistors 264 and 265, and with transistor 266, the base electrode of which is grounded, the other end of the transistor 266 is connected to one end of a resistor 267 the other end of which is connected to the base electrode of a transistor 268. The transistor 268 is connected in series with the other throttle potentiometer 271 which has one end grounded. Again, the resistors 264, 265 and 267 in combination with the transistors 266 and 268 comprise a regulating circuit which tends to maintain a constant current flowing through the potentiometers 214 and 271. The base electrode of the transistor 266 is grounded, which means that this transistor will form an essentially constant current device. If constant current is caused to flow through resistors 267 and 269, then the potential applied to the base electrode of the transistor 268 will also be constant to render that transistor an essentially constant current device. This circuitry tends to eliminate variations due to ambient conditions, ageing, and the like. In addition, this circuitry applies an opposite potential to the potentiometer 271 As a general rule in an aircraft there will be an increase in the speed of the engine by something in the order to 100 r.p.m. when the ignition switch is changed from one-magneto position to a two-magneto position. This is the purpose for providing the ignition switch 256 with its four separate positions. This also indicates the reason for the difference in the values of the resistor 263 and that of the resistors 261 and 262. The block diagram of FIG. 1A shows the output of a single throttle potentiometer 16 being applied to the input of a thrust generator 45, whereas the schematic diagram of FIG. 2A illustrates a different form of circuit. With the computer of this invention either type of circuit may be used.

Some terms are used in several portions of the computer for computing different values. These terms may be separately computed and applied directly. One example of this is the reciprocal of the airspeed. In computing the roll, yaw and pitch moments, one term used is the dynamic pressure divided by the airspeed. In computing the side slip, one term used is the dynamic pressure over the airspeed and another term is the reciprocal of the airspeed itself. Since there are several places where the airspeed is used as a divisor, a circuit designated 275 on FIG. 2B generates the reciprocal of the airspeed. This circuit comprises an operational amplifier 276 which has one of its two inputs grounded and a positive potential applied to the other input through a resistor 277. The feedback path of the amplifier 276 comprises three parallel circuits. One of the circuits includes a resistor 278 and a field effect transistor 279. The resistor 278 has one end connected to the output of the amplifier 276 and the other end connected to the source electrode of the field effect transistor 279. The gate electrode of the transistor 279 has applied to it the time division representation of airspeed from the output of the amplifier 231. Since the input to the amplifier 276 is a constant potential, and since the field effect transistor 279 is provided in the feedback path of the amplifier 276, the effect of the circuit is to divide the constant input signal by the airspeed. Thus, the output is proportional to one over the airspeed. Since this quantity is to be used as a multiplier, and amplifier 281 has applied to it through a resistor 282 the output from the amplifier 276 and also through a resistor 283 the triangular wave from the source 228 to generate a rectangular pulse output proportional to one over the airspeed.

Figure 2D:
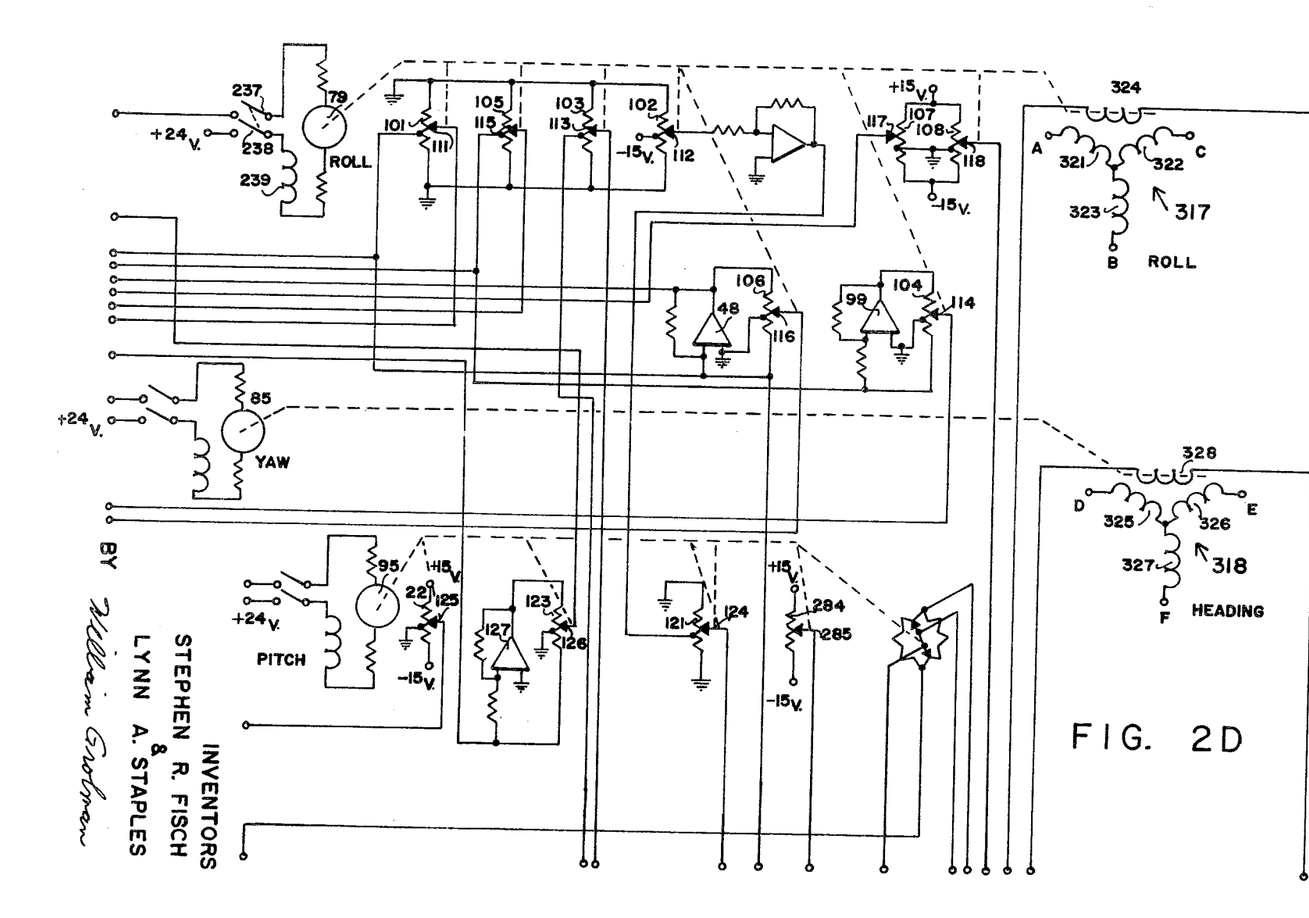

Many quantities are modified by the roll or pitch of the aircraft. When used in calculations, generally the sine or the cosine of the roll or pitch angle is used as a quantity for computation. In FIG. 2D the roll, the yaw and the pitch motors are shown driving those potentiometers which are used for computation purposes. Four potentiometers 101, 102, 103 and 105 have their two ends connected to ground. The input to the center tap of potentiometer 101 comes from the output of the pitch moment generator and the output from that potentiometer represents the cosine of the pitch angle. These potentiometers are shaped potentiometers. The movement of the slides is proportional to the sine or cosine of an angle. When the outside ends of the potentiometer are grounded, the potentiometer is a cosine potentiometer. The maximum potential is reached when the slide is adjacent the center tap, and the minimum potential is reached when the slide is adjacent either end. Thus, the four potentiometers mentioned, 101, 102, 103 and 105, are cosine potentiometers and their outputs represent the cosine of the roll angle times whatever quantity is applied to their center taps. The output on the slide 111 is proportional to the pitch moment times the cosine of the roll angle, and the output on the slide 115 is proportional to the yaw moment times the cosine of the roll angle. Potentiometer 102 has a minus potential applied to its center tap. This potentiometer then merely provides an output which is proportional to the cosine of the roll angle. Two potentiometers 107 and 108 have a positive potential applied to one end and a negative potential applied to the other. These potentiometers are also shaped in accordance with a sine function. Since fixed potentials are applied across the potentiometers and since the center taps are grounded providing zero potential at the center and maximum potential at either end, the outputs are merely representative of the sine of the roll angle without being multiplied by any other quantity. The potentiometers 106 and 104 are similarly connected but have different quantities applied to them. Potentiometer 104 has the yaw angle, or heading, directly applied to one end and through an inverter to the other end. Its center tap is grounded. This means that the output on the slide 114 is proportional to plus or minus the yaw times the sine of the roll angle. Similarly, since the potentiometer 106 has the pitch angle directly applied to one end and through an inverter to the other end, its output on slide 116 is proportional to the pitch moment times the sine of the roll angle. The four potentiometers driven by the pitch motor operate similarly to those driven by the roll motor. In accordance with the discussion above, the potentiometers 122 and 284 are sine potentiometers which produce outputs proportional to the sine of the pitch angle. Potentiometer 123 is a sine potentiometer which produces an output proportional to the heading times the sine of the pitch angle. Potentiometer 121 is a cosine potentiometer which produces an output proportional to its input on the center tap times the cosine of the pitch heading. The input on the center tap is the cosine of the roll angle. Therefore, the output at slide 124 is equivalent to the quantity cosine of the roll angle times the sine of the pitch angle ($\cos \phi \sin \theta$).

The most difficult quantity to compute is airspeed because this is affected by so many different factors. The airspeed generator is shown in FIG. 2B at 227 and it comprises a single operational amplifier 291 one input of which is grounded, the other input 292 to the amplifier receiving information from many sources. A voltage derived from the slide contact 125 of the potentiometer 122 shown in FIG. 2D and representative of the sine of the pitch angle is applied through an input resistor 294. A signal taken from the slide contact 111 of the potentiometer 101 and representing the cosine of the heading or yaw moment is applied through an input resistor 293, and an input from the slide contact of throttle potentiometer 271 is applied through an input resistor 295. The signals applied to the resistors 293, 294 and 295 are added together and applied directly to the input of the amplifier 291. In addition, a second group of signals are also added together. A signal representative of the flap condition is applied from the flap switch 305 which has three positions, 306, 307 and 308. A resistor 309 is connected between the positions 307 and 308 and a second resistor 311 is connected between positions 306 and 307. A plus 15 volts is applied to one side of resistor 311, and a ground is applied to the other side of resistor 309. A constant voltage is applied through a resistor 297 and a signal representative of the square of the lift coefficient is applied to the input resistor 298 from the operational amplifier 312. These signals applied through the resistors 296–298 are added together and the sum is applied to the source electrode of a field effect transistor 304. A signal representative of dynamic pressure is applied to the gate electrode of the transistor 304 to multiply the sum of the other signals. This product generated by the transistor 304 is then added to the sum of the signals applied to the resistors 293–295, and the sum is applied to the input of the amplifier 291. The output of the amplifier 291 is fed back through a feedback circuit which includes a capacitor 315 and a pair of reversely connected diodes 316. Thus, as explained above, addition is accomplished in this circuit by applying signals to one end of individual resistors which are connected together at their other ends. Multiplication is achieved in the field effect transistor 304 as explained above. Integration is achieved by the operational amplifier 291 and its integrating feedback path which includes the integrating capacitor 315. The output from the airspeed generator 227 is applied, as mentioned above, through a resistor 241 to one input of the time division amplifier 231. The other input to that amplifier is applied through the resistor 242 from the triangular wave generator 228. The output from amplifier 231 is applied to all of those circuits in which the airspeed is used as part of the computation.

Figures 2E, 3, 4:
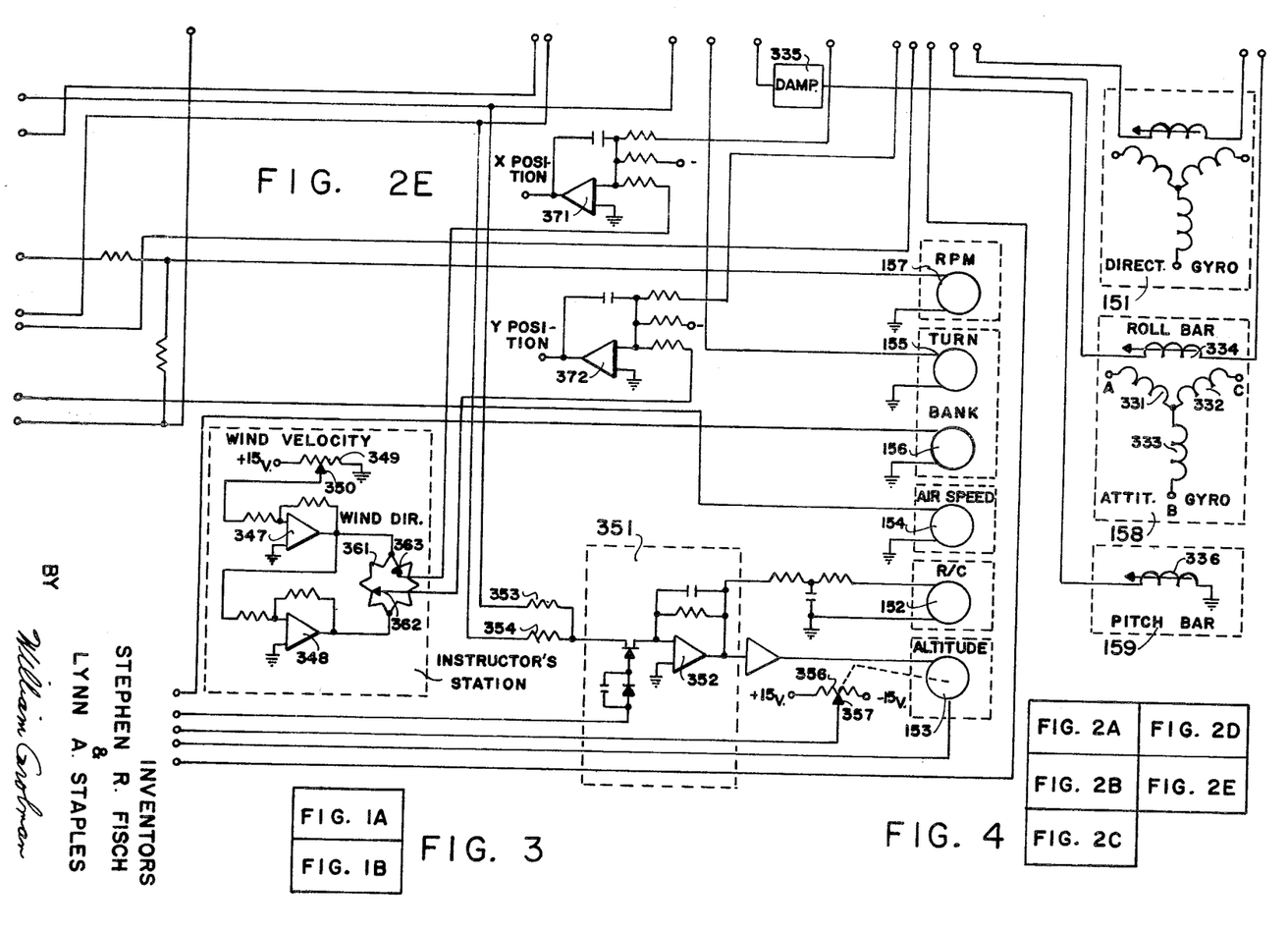

The array of instruments 151–159 are shown on FIG. 2E. The directional gyro 151, the attitude gyro 158 and the pitch bar 159 are shown in greater detail in FIG. 2E than on the block diagram FIG. 1B. Referring to FIG. 2D, along the right-hand edge of the drawing there are shown two synchros, the roll synchro 317 and the heading synchro 318. The roll synchro 317 comprises three coils 321, 322 and 323 connected together in a Y. The outer ends of the coils are labeled A, C, B, respectively. A single armature coil 324 is shown mechanically ganged with the potentiometer arms 111–118. Similarly, the heading synchro comprises three stator coils 325, 326 and 327 connected together in a Y connection. The outer terminals of these coils are labeled D, E and F, respectively. In addition, an armature coil 328 is shown ganged to the yaw motor 85. On FIG. 2E, the directional gyro 151 is shown comprising three stator coils 331, 332 and 333 connected together in a Y connection with their outer ends labeled A, C, B, respectively, to correspond with the outer ends of the coils 321, 322 and 323 of the roll synchro 317. In addition, a roll bar 334 is shown in the attitude gyro 158. To avoid unduly complicating the drawings which are already quite cluttered, the lines connecting the synchro coils 321–323 and the gyro coils 331–333 have not been shown. However, the two terminals A, the two terminals B, and the two terminals C are connected together. The stator coils are, of course, energized from a suitable power supply which is not shown. The armature 324 of the roll synchro is connected to the roll bar 334 of the attitude gyro 158. As the armature 324 is rotated by the roll motor 79, the alternating potentials induced in that coil by the currents flowing through the three Y connected coils 321–323 cause current to flow through the wires to the roll bar 334. The magnetic field established by the current flow through the roll bar 334 reacts with the magnetic fields established by the Y connected coils 331–333 to create a torque on the roll bar 334. The roll bar 334 is caused to rotate until the potentials induced therein by the magnetic field created by the currents flowing through the three Y connected coils 331–333 becomes equal and opposite to the currents supplied from the synchro armature. In this manner, the roll bar assumes the same angular position with respect to its coils 331–333 as the armature 324 assumes with respect to its coils 321–323. The heading synchro 318 and the directional gyro 151 operate in a similar manner. In addition, a pitch bar 159 is provided, and it receives signals from the potentiometer 284 which supplies, through the slide contact 285, a potential representative of the sine of the pitch angle. This is applied through a damper circuit 335 to the input of the pitch bar coil 336, the other end of which is grounded. The pitch bar coil 336 is usually rotatably mounted in a magnetic field which may be created by permanent magnets and which is not shown in these drawings. Thus, the current flow through the coil 336 creates a magnetic field which reacts with the permanent magnetic field to cause the pitch bar to rotate to an appropriate position.

The input to the tachometer 157 is received directly from the throttle potentiometer 214. Similarly, the input to the turn indicator 155 is the yaw moment derived from the yaw moment generator 41. However, the ball angle applied to the indicator 156 is derived from other quantities by the ball angle generator 341 which comprises an operational amplifier 342. An input signal representative of lift from the lift generator is applied through an input resistor 243 directly to the amplifier 342. Signals representative of side slip and of rudder pedal deflection are applied through resistors 344 and 345 respectively to the source input of a field effect transistor 346, the gate electrode of which has the dynamic pressure applied to it. The algebraic sum of the two inputs through the resistors 344 and 345 to the source electrode of the transistor 346 is multiplied by the dynamic pressure, and the result is added to the input to the resistor 343. Since the operation is the same as similar elements described above, no further explanation is required. Airspeed is computed by the airspeed generator 227 on FIG. 2B which was described in some detail above. This information is applied to the airspeed indicator 154. Rate-of-climb was described somewhat in connection with the block diagram FIG. 1B, but it is shown in better detail in FIG. 2E. The rate-of-climb generator 351 is shown on FIG. 2E and comprises an operational amplifier having one input grounded and the other input connected to the drain electrode of a field effect transistor 355. The source electrode of the transistor 355 is connected through a resistor 353 to the slide contact 125 of the potentiometer 122, and through a resistor 354 to the slide contact 113 of the potentiometer 103. This introduces two quantities which are the angle of attack times the cosine of the roll angle and the sine of the pitch angle. The drain electrode of the transistor 355 has the airspeed applied to it to produce the rate-of-climb which is the airspeed times the quantity sine of pitch less the angle of attack times the cosine of roll. The altitude signals applied to the altimeter 153 are the rate-of-climb integrated, and the integration is performed by the altimeter itself. The altimeter 153 drives a potentiometer 356 which has a slide contact 357. This produces the altitude signal which is used elsewhere in the computer.

In addition, the computer may incorporate additional devices not shown in the block diagram of FIGS. 1A and 1B. An instructor's station may be included so that additional quantities may be inserted. For example, one such device is shown on FIG. 2E. A potentiometer bridge 361 having a pair of slide contacts 362 and 363 has applied across it the outputs from two cascaded amplifiers 347 and 348. The input to amplifier 347 is derived from a potentiometer 349 which has one end connected to a source of positive potential and the other end grounded, and whose slide contact 350 is connected to the input of the amplifier 347. The input to amplifier 348 is the output of amplifier 347. The slide contact 350 of the potentiometer 349 may be set by an instructor. Thus, one side of the bridge 361 has a positive potential representing wind velocity applied to it and the other side a negative voltage representing the same thing applied to it. The two slide contacts 362 and 363 are also manually adjustable by an instructor and represent wind direction. The potentials derived on the slide contacts 362 and 363 are applied to the inputs of two amplifiers 371 and 372 which compute the X and the Y position of the aircraft on a simulated mission, should this be desired for navigational purposes. The other inputs to the amplifiers 371 and 372 are derived from the slide contacts 374 and 375 of another potentiometer bridge 373 in FIG. 2D. The bridge 373 has applied across it potentials representative of plus and minus airspeed, and the slide contacts 374 and 375 are driven by the heading motor 85. Thus, the X and Y position of the aircraft are computed from the airspeed, the heading and the wind direction and velocity. The instructor can modify the simulated movement by changing the settings of the potentiometers at the instructor's station. In addition, another potentiometer which can be incorporated in an instructor's station is shown on FIG. 2C. A field elevation potentiometer 381 having a slide contact 382 which can be set by the instructor is used to set the ground elevation below which the simulated aircraft should not fly. The voltage developed on the slide contact 382 is applied as one input to the amplifier 312 which also has the simulated altitude of the aircraft applied to it. The output of this amplifier is used as part of the on-ground detector circuit.

One thrust circuit which can be used in the block 45 of FIG. 1A is shown in detail in FIG. 5. The throttle potentiometer 16 has an additional resistor 261 connected across at least a portion of it to shape the potentiometer in accordance with the thrust curve. The thrust curve rises generally linearly but has a knee at which the slope of the curve changes. One end of the potentiometer 16 is connected to a source of positive potential and the other end has airspeed applied to it from line 136. The output of the potentiometer 16 is taken from the slide 29 through a resistor 262 and is applied to the input of an amplifier 263 which has a feedback resistor 264. Positive thrust is derived from this amplifier. A second amplifier stage 266 having a feedback path 267 derives its input from the amplifier 263 through a resistor 265. This produces negative thrust. Both amplifiers 263 and 266 are unity gain amplifiers.

This specification has described and illustrated a new and improved analog computer suitable for use in small vehicle trainers for computing the information required to produce the proper motion and instrument responses. It is realized that the above description may indicate to others in the art additional ways in which the principles of this invention may be used without departing from its spirit.

What is claimed is:

1. A computer module for algebraically adding together first and second quantities and for multiplying the resultant sums by a third quantity, said module comprising a single operational amplifier having an input and an output, means for applying a first potential representative of a first quantity to said input, means for applying a second potential representative of a second quantity to said input in additive relation to said first quantity, a modulator, means for applying a triangular wave to said modulator, means for applying a third potential representative of a third quantity to said modulator so that said modulator produces rectangular waves whose widths are proportional to said third quantity, an electronic switch having a main conductive path and a control electrode, means for connecting said main conductive path from said output to said input, means for applying said rectangular waves to said control electrode, and means forming a feedback path from said output to said input for integrating the output potential of said amplifier to produce a potential which is proportional to the sum of said first and second quantities multiplied by said third quantity.

2. A computer for calculating operational response values from a plurality of input values, said computer comprising at least a first computational station, said first station including means for combining electrical potentials representative of a plurality of first values to produce the algebraic sum of those first values, multiplying means for modifying said sum of said first values by a potential representative of a second value to produce an output potential representative of the product of the sum of said first values and said second value, said means for multiplying comprising an electron discharge device having at least two input electrodes, means for applying the potential representative of the multiplicand to one of said electrodes, means for applying the potential representative of the multiplier to the other of said electrodes, the potential representing the multiplicand having an amplitude representative of the multiplicand and the potential representing the multiplier having a pulse width representative of the multiplier, a source of triangular waves, a differential amplifier means, means for applying the output from said source to said differential amplifier means, and means for applying a potential whose amplitude is representative of a multiplier to said differential amplifier means so that the output from said amplifier means is a train of generally rectangular pulses whose width is proportional to the amplitude of said potential representative of a multiplier.

3. The computer defined in claim 2 wherein said electron discharge device comprises an electron switch one of whose two electrodes comprises a switch control electrode, means for applying the potential representative of the multiplier to said control electrode and means for applying the potential representative of said multiplicand to said other electrode so that said switch is opened and closed by said multiplier pulses.

4. The computer defined in claim 3 further including means for integrating the pulse output from said electron switch to produce a potential which is proportional to the area under the pulse output, said area being the equivalent of the pulse amplitude times the pulse time.

5. A computer for calculating operational response values from a plurality of input values, said computer comprising at least a first computational station, said first station including means for combining electrical potentials representative of a plurality of first values to produce the algebraic sum of those first values, means for modifying said sum of said first values by a potential representative of a second value to produce an output potential representative of the product of the sum of said first values and said second value, means for integrating the product produced thereby comprising an operational amplifier having two inputs and a single output, means for connecting one of said inputs to ground, and means for connecting an integrating capacitor from the output of said amplifier to the other of said two inputs.

6. A computer for utilizing electrical potentials representative of numerical quantities and modifying one quantity by another to produce a potential which is representative of a desired mathematical result, said computer comprising a plurality of computational stations, means at a first computational station for receiving a plurality of first potentials each of which is representative of a numerical quantity, means for combining said first potentials to produce a potential representative of the algebraic sum of the numerical values represented by said first potentials, said first computational station comprising a single operational amplifier having an input and an output, means for connecting said combining means to said input, a feedback path from said output to said input, means for receiving a second potential representative of a second quantity, means in said feedback path for modifying the potential representative of said sum by said second potential to produce a product potential representative of said sum multiplied by said second quantity, and means in said feedback path for integrating said product potential to produce a potential representative of the mathematical integral of said product; a second computational station comprising means for receiving the integral potential output from said first computational station, means for receiving third potentials representative of quantities to be added, means for combining the third potentials with said integral potentials to produce a potential representative of a sum, and means for integrating the potential representative of a sum.

References Cited

UNITED STATES PATENTS

| | | | |
|---|---|---|---|
| 2,701,922 | 2/1955 | Dehmel | 35—12 |
| 2,842,867 | 7/1958 | Dehmel | 35—12 |
| 2,858,623 | 11/1958 | Stern et al. | 35—12 |
| 2,882,615 | 4/1959 | Dawson | 35—12 |
| 3,035,354 | 5/1962 | Greenhalf | 35—10.2 |
| 3,167,649 | 1/1965 | Walp | 235—194 |
| 3,208,065 | 9/1965 | Gutleber et al. | 235—181 X |
| 3,295,362 | 1/1967 | Wood et al. | 235—181 X |
| 3,396,267 | 6/1968 | Dietrich | 235—193 |

MALCOLM A. MORRISON, Primary Examiner

R. W. WEIG, Assistant Examiner

U.S. Cl. X.R.

35—12; 235—193, 194, 197